United States Patent [19]

Verwaerde et al.

[11] 4,346,116

[45] * Aug. 24, 1982

[54] NON-CARIOGENIC HYDROGENATED STARCH HYDROLYSATE, PROCESS FOR THE PREPARATION AND APPLICATIONS OF THIS HYDROLYSATE

[75] Inventors: Francoise Verwaerde; Jean-Bernard Leleu; Michel Huchette, all of Lestrem, France

[73] Assignee: Roquette Freres, France

[ * ] Notice: The portion of the term of this patent subsequent to Jul. 21, 1998, has been disclaimed.

[21] Appl. No.: 151,816

[22] Filed: May 21, 1980

Related U.S. Application Data

[63] Continuation-in-part of Ser. No. 38,711, May 14, 1979, Pat. No. 4,279,931.

[30] Foreign Application Priority Data

Dec. 11, 1978 [FR] France .............................. 78 34830
Dec. 4, 1979 [IE] Ireland .............................. 2322/79

[51] Int. Cl.³ .......................... A23L 1/09; C13K 7/00
[52] U.S. Cl. .................................. 426/48; 426/548; 426/658; 127/38; 435/95; 435/98
[58] Field of Search .................... 426/18, 48, 52, 548, 426/658, 661; 435/95, 98; 127/38, 40

[56] References Cited

U.S. PATENT DOCUMENTS

| | | | |
|---|---|---|---|
| Re. 26,959 | 9/1970 | Conrad .................................. | 426/48 |
| 2,822,303 | 2/1958 | Campbell et al. ................ | 426/48 X |
| 2,891,869 | 6/1959 | Langlois ............................... | 426/48 |
| 3,067,066 | 12/1962 | Ehrenthal et al. ................ | 426/48 X |
| 3,137,639 | 6/1964 | Hurst et al. ........................ | 426/48 X |
| 3,644,126 | 2/1972 | Bodnar et al. ..................... | 426/48 |
| 3,868,464 | 2/1975 | Koaze et al. ........................ | 426/48 |

FOREIGN PATENT DOCUMENTS

| | | |
|---|---|---|
| 287116 | 8/1965 | Australia . |
| 421659 | 6/1969 | Australia . |
| 1517810 | 9/1969 | Fed. Rep. of Germany . |
| 2000580 | 9/1969 | France . |
| 1299206 | 12/1972 | United Kingdom . |

OTHER PUBLICATIONS

Convention Application for a Patent, Commonwealth of Australia, No. 55386/69.

*Primary Examiner*—Robert A. Yoncoskie
*Attorney, Agent, or Firm*—Larson and Taylor

[57] ABSTRACT

The invention relates to a non-cariogenic hydrogenated starch hydrolysate as well as to a process for preparing it.

The starch hydrolysate according to the invention comprises:
  less than 3% by weight of polyols of DP higher than 20;
  less than 60% by weight of maltitol (DP 2);
  less than 19% by weight of sorbitol (DP 1), the balance to 100 being constituted by polyols of DP 3 to 20.

This starch hydrolysate can be used in food products as a sweetening non-cariogenic agent.

14 Claims, No Drawings

NON-CARIOGENIC HYDROGENATED STARCH HYDROLYSATE, PROCESS FOR THE PREPARATION AND APPLICATIONS OF THIS HYDROLYSATE

This is a continuation-in-part of application Ser. No. 38,711, filed on May 14, 1978 (now U.S. Pat. No. 4,279,931).

The invention relates to a non-cariogenic hydrogenated starch hydrolysate, which can be used as a sweetening agent in food products.

The invention also relates to the process for the preparation of said hydrolysate, as well as the application in food products of this hydrolysate as a sweetening agent which does not account for dental decay.

By the expression "food products" is meant products intended for oral administration, such as various food substances such as confectionery, pastries, creams, beverages and jams as well as pharmaceutical, dietetic or hygienic products, such as, for example, elixirs and syrups for combatting coughs, tablets or pills and toothpastes.

It is notably in the field of confectionery generally, and more particularly, in that of the manufacture of "hard candies" or boiled sweets and chewing gums that the application of the non-cariogenic hydrogenated starch hydrolysate according to the invention is interesting, it being understood that the term "candies" (sweetmeats or sweets) includes also chocolates, toffees, caramels, gelatin articles, crystallised fruits, fondants and the like. Non-cariogenic hydrogenated starch hydrolysates, for example, sorbitol syrups, are already known; furthermore, the use of hydrogenated starch hydrolysates for confectionery has already been proposed.

However, these proposals have not always led to results which are satisfactory in all respects.

In fact, it is found that, when the known hydrolysates were not cariogenic, it was difficult to use them in confectionery, notably for the manufacture of "hard candies", notably because of their lack of "body" and their too pronounced hygroscopic character; conversely, the hydrolysates technologically useful in confectionery and notably for the manufacture of these candies, were in fact found to be cariogenic.

It is an object of Applicants invention, consequently, to provide a hydrolysate complying simultaneously with these two requirements which appeared contradictory and according to which object said hydrolysate, while being not cariogenic, must be able to be used in confectionery and, in particular, be suitable, technologically, for the manufacture of "hard candies".

The Applicant has now had the merit of finding that a non-cariogenic hydrolysate, whilst being suitable for use in confectionery—this term being taken in its wide meaning as above defined—and especially for the manufacture of "hard candies" was to contain, on the one hand, only very little polysaccharides with a "degree of polymerization" or "DP" higher than 20, these polysaccharides—or the corresponding polyols obtained by hydrogenation—being the essential cause of the cariogenic character of the hydrolysates and was to contain, on the other hand, only a limited proportion of the low molecular weight products, especially those of DP 1 and of DP 2, responsible when they are present in too high a proportion for the difficulties which result when the corresponding hydrolysates are applied in confectionery.

Thus, the non-cariogenic hydrogenated starch hydrolysates according to the invention for confectionery and especially for the manufacture of "hard candies" and chewing-gums comprise a content of polyols of DP higher than 20 which is sufficiently low for the cariogenic character of these polyols not to be of trouble and a content of low molecular weight substances, particularly of substances of DP 1 and DP 2, which content is sufficiently low for their presence not to interfere with the applicability, from the technological point of view, of said hydrolysates in confectionery.

According to a first aspect of the invention, the non-cariogenic hydrogenated starch hydrolysates contain (the percentages being expressed by weight of dry matter) less than 3% of polyols of DP higher than 20, less than about 60% of maltitol (DP 2) and less than about 14% of sorbitol (DP 1), the balance to 100 being constituted by polyols of DP 3 to 20.

According to a second aspect of the invention, the abovementioned hydrolysates contain less than 3% of polyols of DP higher than 20, less than about 60% of maltitol (DP 2) and less than about 19% of sorbitol (DP 1), the balance to 100 being constituted by polyols of DP 3 to 20.

The non-cariogenic hydrogenated hydrolysates according to the invention are, preferably, in addition characterized by the fact that their content of polyols of DP less than 3 is less than 65%, preferably comprised between 45 and 65% and, more preferably again, comprised between 50 and 62%.

Preferably, the hydrolysates according to the invention are characterized by:
a content less than 3% by weight of polyols of DP higher than 20,
a content of 35 to 60% by weight of maltitol,
a content of 0.1 to 17% by weight of sorbitol, the balance to 100 being constituted by a mixture of polyols of DP 3 to 20.

More preferably again, the hydrolysates according to the invention are characterized by:
a content less than 3% by weight of polyols of DP higher than 20,
a content of 40 to 55% by weight of maltitol,
a content of 0.3 to 14% by weight of sorbitol, the balance to 100 being constituted by a mixture of polyols of DP 3 to 20.

The viscosity of the hydrogenated hydrolysates according to the invention is generally from 1000 to 4000 centipoises at 20° C. and with 74% of dry matter.

To prepare a non-cariogenic hydrogenated starch hydrolysate for confectionery and notably for the manufacture of "hard candies" and of chewing-gums, in accordance with the invention, a starch prehydrolysate of DE (dextrose equivalent) of 10 to 35, obtained by the acid or enzymatic route, is subjected to an enzymatic treatment including at least the action of a β-amylase, the conditions of this treatment being selected so that the DE of the hydrolysate is brought to a value of 45 to 53, after this treatment, the hydrolysates obtained being then hydrogenated.

When the starch prehydrolysate is obtained by acid hydrolysis and has a DE of 27 to 35, a treatment with β-amylase alone is sufficient to obtain a non-cariogenic hydrogenated starch hydrolysate, that is to say having a percentage of substances of DP greater than 20 less than 3%.

When the starch prehydrolysate has a DE of 10 to 27, typically of 17 to 27, the enzymatic treatment includes successfully:

the action of the β-amylase, the supplementary action of an α-amylase, the amounts and the duration of action of these two enzymes being then selected so that the DE of the hydrolysate is brought to a value of 45 to 48, typically of 46 to 48, on emerging from the first enzymatic treatment and to a value of 48 to 51, typically of 48 to 50, on emerging from the second, the final hydrolysate then being hydrogenated.

It may be advantageous to reduce further the proportion of polysaccharides of DP higher than 20 subsisting on emerging from these two successive enzymatic actions; to do this, it is possible to subject, in an additional step and before hydrogenation, the hydrolysate of DE of value from 48 to 51 to the conjugate action of a β-amylase and of an enzyme hydrolysing the 1-6 linkages of the amylopectin.

According to another embodiment, it is possible to eliminate the additional treatment with α-amylase, by subjecting the prehydrolysate of DE 10 to 27, typically 17 to 27, obtained by the acid or enzymatic route, successively to saccharification by means of a β-amylase up to a DE of 45 to 48, typically 46 to 48, and to a fractionation by passage over a cationic resin preferably in the calcium from, or over a molecular sieve, this fractionation having the purpose of eliminating the polysaccharides of DP>20; the syrups thus-obtained being then hydrogenated.

It is also possible to resort to fractionating treatments by passage over cationic resin or molecular sieve to remove from the hydrolysate the fraction of DP 1.

It is also possible to reduce the fraction of DP 1 by the action of a yeast.

The hydrogenation of the above-mentioned hydrolysates can be carried out in a known manner, typically until a reducing sugar content of less than about 0.2 weight-%, preferably of less than about 0.1 weight-% (this percentage being based on glucose with respect to commercial syrup having a dry matter content of 75%), by the Raney nickel method, i.e. by high pressure hydrogenation similarly to glucose hydrogenation (reference is being made to the Merck Index, edition of 1976, chapter 8497, the contents of which are included in the present specification by way of reference).

For hydrogenation, the hydrolysate is introduced into a hydrogenation reactor after purification with activated carbon and resins and concentration until a dry matter content of about 37 to 40 weight-%.

The hydrogenation takes place in presence of Raney nickel, at a temperature of about 100° C. to 150° C. and under a hydrogen pressure of about 40 to 70 kg/cm². The hydrogenation is brought to a close after a reaction time of about 2 to 4 hours.

The catalytic agent constituted by the Raney nickel is separated by decantation. Successively, the hydrogenated-hydrolysate is introduced in a conical decanting device, filtered in order to remove the ultimate traces of catalytic agent, demineralized on cationic and anionic resins and evaporated until a dry matter content of about 75 weight-%.

In connection with the above-mentioned enzymatic treatment, the amounts and conditions of action of the different enzymes cited previously are preferably selected from among the following:

β-amylase: 200 to 1000 international units per kg of dry substrate, temperature from 50° C. to 60° C., duration of action from 30 to 72 hours, α-amylase: 16,000 to 48,000 international units per kg of dry substrate, pH from 5.0 to 6.0, temperature from 50° C. to 60° C., duration of action from 16 to 30 hours, enzyme hydrolysing the 1-6 linkages: 120 to 400 international units per kg of dry substrate, in the presence of 15 to 100 international units of β-amylase per kg of dry substrate, pH 5.0 to 6.0, temperature from 50° C. to 60° C., duration of action from 24 to 48 hours.

As starting material for the preparation of the prehydrolysate of DE 10 to 35, typically 17 to 27, it is possible to use all types of starch, potato starch, manioc starch, wheat and the like.

The enzymes utilized may be:

β-amylase in the form of malt extract,

α-amylase obtained from *Bacillus subtilis* or *licheniformis*, enzyme hydrolysing the 1-6 linkages, as pullulanase or isoamylase.

The action of the β-amylase on the starch previously liquefied by the acid or enzymatic route is manifested by the formation of an amount of maltose of about 35 to 55%.

The α-amylase, when it is added in accordance with the invention, is alone at this moment, and accounts for a translation of the molecules of DP greater than 20 to oligosaccharides, and more precisely to those of DP 8 to DP 6.

The molecules with high DP subsisting after attack by the α-amylase and containing the 1-6 linkages, may then be, if necessary, hydrolysed by an enzyme hydrolysing the 1-6 linkages. The smaller molecules thus obtained again become a substrate suitable for the action of the β-amylase.

Through the fractionation according to the abovesaid embodiment applied to the hydrolysate obtained by saccharification by means of the β-amylase, the polysaccharides of high DP are removed, eluted first during the passage over the cationic resin or over the molecular sieve.

A preferred hydrogenated hydrolysate according to the invention which is non-cariogenic, corresponds to the following composition:

a content of less than 3%, preferably than 1.5% of substances of DP higher than 20, a content of 4 to 14%, preferably from 5 to 8% of sorbitol, a content of 45 to 60%, preferably from 50 to 53% of maltitol, the balance to 100 being constituted by a mixture of polyols of DP 3 to 20, this hydrolysate being in the form of a clear syrup, of viscosity of about 1500 to 2100 centipoises, measured at 20° C. for a concentration of 74% of dry matter.

This preferred non-cariogenic hydrogenated starch hydrolysate, which has a low percentage of very hygroscopic sorbitol and a high proportion of maltitol resulting in a highly sweet taste, and which possesses a "body" and a texture sufficient for the manufacture of "hard candies", may be prepared according to the invention by subjecting a prehydrolysate of starch of DE from 10 to 27, preferably from 17 to 27, obtained by the acid route successively:

to the action of a β-amylase and to the action of an α-amylase, the conditions of action of these two enzymes being selected within the previously indicated limits, and then hydrogenating the final hydrolysates obtained by the conventional method with Raney nickel.

The non-cariogenic hydrogenated starch hydrolysates according to the invention are preferably in the form of syrups concentrated to 70 to 80% of dry matter, but they may also be in the form of a very hydroscopic white powder, which may be obtained either by spraying the hydrolysates or by grinding at a controlled temperature the hydrolysates solidified by total evaporation and then cooling.

To control the non-cariogenic character of the hydrogenated hydrolysates prepared, recourse is had to a simple test based on the observation according to which an non-cariogenic product is not attacked by the bacteria of the mouth, and as a corollary, does not cause acidification, the cause of attack of the surface of the teeth and hence the cause of dental decays. A simple test has been developed to determine this acidification in vitro. It is based on the evaluation of the drop in pH, in the course of time, of a culture broth containing the glucide to be tested after seeding with saliva derived from several donors, in comparison with control culture broths containing no glucide.

This test is not sufficient to characterize the non-cariogenicity of a substance in an absolute way, since its results can vary, for example, according to the quality of the saliva used, but it nevertheless enables valuable comparisons to be established between different products.

The detailed operational method of this test is as follows.

A series of tubes containing 10 ml of a nutrient culture medium (TRYPTICASE medium with 2% of dry matter) is prepared without sugar at pH 7, and these tubes are sterilized by passage through an autoclave at 120° C. for 20 minutes. Into a first series of five tubes, 1 ml of sterile water is introduced to make a control series.

Into a second series of five tubes, 1 ml of 18% solution (P/V) of the product to be tested is introduced.

Then four tubes of each series are seeded with a same volume of 0.2 ml per tube of a diluted human saliva obtained by sampling from five donors.

The acid formation is then followed by electrical pH measurement, a first measurement being effected before incubation and the other measurements being effected after incubations at 30° C. of respectively 3, 6, 13, 18 and 21 hours.

A product is considered as non-cariogenic, provided that the pH difference observed between the control at the end of 21 hours and the product to be tested at the end of 21 hours, not to be too pronounced and, in practice, at the most equal to 1 pH unit.

The more branched the polyols of fraction DP 3 to DP 20, are the less the lowering of the pH.

By way of illustration, the comparison was made between saccharose and two hydrogenated syrups: the first syrup was a syrup according to the invention, non-cariogenic (Syrup I) containing 0,5% of polyols at DP 20, the second syrup was a conventional cariogenic syrup (Syrup II) containing 8% of polyols of DP higher than 20.

The variations of pH as a function of time for the control water, the saccharose and the syrups No. I and No. II are presented in Table I.

TABLE I

|  | t = 0 hours | t = 3 hours | t = 6 hours | t = 13 hours | t = 18 hours | t = 21 hours |
|---|---|---|---|---|---|---|
| Water control | 7,55 | 7,40 | 7,40 | 7,35 | 7,25 | 7,20 |
| Saccharose | 7,55 | 7,20 | 6,80 | 4,65 | 4,65 | 4,60 |
| Syrup N° I | 7,55 | 7,40 | 7,35 | 6,75 | 6,75 | 6,60 |
| Syrup N° II | 7,55 | 7,40 | 7,35 | 5,95 | 5,95 | 5,65 |

Incubation temperature: 30° C.

Below, are indicated some examples of hydrolysates according to the invention, as well as their process of manufacture and certain of their applications in the preparation of edible products.

EXAMPLE 1

An amount of 12 liters of starch milk with 33% of dry matter is liquefied by the acid route to a DE of 22,0. It is introduced into a 25 liter tank after having previously cooled it to 55° and the pH is readjusted to 5,65.

1730 international units of β-amylase are added in the form of malt extract. The speed of hydrolysis is followed by estimating the reducing sugars on regular samplings until a stable maximum DE of 47,0 (36 hours) is obtained.

At this moment, without rectification of pH, 140.000 international units of α-amylase are added and it is left to incubate at 55° C. until the glucid spectrum carried out indicates a proportion of polysaccharides of DP higher than 20, of about 1,5% (36 hours). The glucid spectrum obtained is indicated in Table II.

TABLE II

| Glucid distribution of the hydrolysate obtained | |
|---|---|
| DP of Products | Content of the Syrup in % |
| DP 1 | 7,0 |
| DP 2 | 51,5 |
| DP 3 | 18,0 |
| DP 4 | 1,5 |
| DP 5 | 1,7 |
| DP 6 | 2,8 |
| DP 7 | 3,2 |
| DP 8 | 3,2 |
| DP 9 | 2,0 |
| DP 10 | 1,0 |
| Between DP 10 and DP 20 | 6,6 |
| DP higher than 20 | 1,5 |

After hydrogenation, the syrup is tested as regards non-cariogenicity. The results of the test are shown in Table III.

TABLE III

| Result of the test of non-cariogenicity with this syrup | | | | | | |
|---|---|---|---|---|---|---|
|  | t = 0 hours | t = 6 hours | t = 9 hours | t = 13 hours | t = 18 hours | t = 21 hours |
| Control | 7,65 | 7,50 | 7,40 | 7,30 | 7,30 | 7,30 |
| Product according to Example 1 | 7,65 | 7,45 | 7,30 | 7,05 | 6,70 | 6,55 |

By means of this product, "hard candy" bonbons are manufactured in the following manner. Flavorings and colorings known in confectionery practice are added to the syrup—in the present example, this was citric acid and a yellow coloring matter suitable for the manufacture of candies of the lemon type—then the mixture was preheated to 95° C. before passing it into a continuous cooker under vacuum of the Hamac-Hansella type. The cooking temperature in this cooker was 170° C. at a maximum vapor pressure of 9 bars. After cooking for 7 minutes, the product was allowed to cool on a refrigerated table to 80° C. The plastic mass was then placed in a roller, then formed into ribbon, molded and cut up into round candies of 2 cm diameter and about 0,5 cm thickness.

The bonbons thus obtained were cooled by a draught to ambient temperature on a mat, then on a cold table before being wrapped; they were hard and brittle.

In the penetrometry test carried out by means of a penetrometer of the calibrated punch type, the value of 165 (in tenths of a millimeter) was recorded. The description of this test is to be found in ASTM D.937 standards.

These candies have been subjected to a group of experienced tasters to whom control candies were also supplied prepared as above but using a conventional saccharose-glucose syrup mixture. These persons have declared that in their opinion, candies prepared with the non-cariogenic hydrogenated hydrolysate of the invention had an excellent taste and that they did not have any disadvantage with respect to the control candies.

EXAMPLE 2

An amount of 12 liters of starch milk with 33% dry matter was liquefied by a liquefying enzyme of *Bacillus subtilis* to a DE of 18,0.

The pH was readjusted to 5,5 and the temperature lowered to 55° C. 2100 international units of $\beta$-amylase were caused to act thereon for a saccharification period of 40 hours. Then 105.000 international units of $\alpha$-amylase were added and it was left to react at 55° C. for 24 hours.

Analysis by a molecular sieve carried out at this stage, shows the presence of 2% of polysaccharides of DP>20.

380 international units of pullulanase and 220 international units $\beta$-amylase were then added. 24 hours later, the proportion of products of DP higher than 20 was equal to 0,5.

The glucid distribution of the hydrolysate thus obtained is shown in Table IV.

TABLE IV

| Glucid distribution of the hydrolysate obtained | |
|---|---|
| Products of DP | Content of the Syrup in % |
| DP 1 | 4,0 |
| DP 2 | 52,4 |
| DP 3 | 18,0 |
| DP 4 | 1,6 |
| DP 5 | 0,7 |
| DP 6 | 2,7 |
| DP 7 | 2,8 |
| DP 8 | 3,1 |
| DP 9 | 2,6 |
| DP 10 | 1,6 |
| Between DP 10 and DP 20 | 10,0 |
| DP higher than 20 | 0,5 |

After hydrogenation, the non-cariogenic syrup obtained was used in the manufacture of chewing gums, as the liquid phase replacing glucose syrups traditionally employed.

From the practical point of view, 25 parts by weight of base gum (such as that marketed under the name "FIRM PALOJA" by the L. A. Dreyfus Company), previously heated to 75° C., were kneaded in the presence of 15 parts of hydrogenated hydrolysate with 75% of dry matter, then gradually the solid phase constituted by 52% of sorbitol powder and 8% of mannitol powder was gradually added. The kneading was then continued for 30 minutes.

After standing for 2 hours, the dough thus prepared was then rolled to a thickness of 1,9 mm, on a roller marketed by the SEEWER A. G. Company of Burgdorf (Switzerland) and then out up into tablets. The kneading and the rolling of the non-cariogenic chewing gums thus manufactured were largely facilitated by the use of the above defined hydrogenated hydrolysate. After an accelerated aging test, which consists of subjecting the chewing gums to a repeated alternation of a hot and wet climate and a hot and dry climate, the chewing gums obtained do not show surface recrystallization, contrary th what results from the use, as a liquid phase, of sorbitol, of glycerin or of any other substance.

These chewing gums have, in addition, a very pleasant taste and texture.

EXAMPLE 3

A kilogram of starch milk with 33% of dry matter was liquefied by the acid route to a DE of 21,0. After cooling at 55° C., the pH was readjusted to 5,50 and 180 international units of $\beta$-amylase in the form of malt extract were added.

The speed of hydrolysis was followed by estimating the reducing sugars carried out on regular samplings until a maximum DE of 48,0 was obtained.

The hydrolysate thus obtained was then percolated at a flow rate of 150 cm$^3$/hour and at 80° C., over a column containing 400 cm$^3$ of resin of the trademark LEWATIT CA 9220 in the calcium form.

The first fractions representing the high molecular weight polysaccharides were removed. These fractions constitute about 10% by weight of the original syrup.

The hydrolysate thus obtained was then hydrogenated. The glucid spectrum is indicated in Table V.

TABLE V

| Glucid distribution of the hydrolysate obtained. | |
|---|---|
| DP Product | Content of syrup in % |
| DP 1 | 5 |
| DP 2 | 55 |
| DP 3 | 20 |
| DP 4 to DP 20 | 20 |
| DP higher than 20 | nil |

This hydrolysate was used for the preparation of a blackcurrant syrup, 150 g of hydrolysate with 75% of dry matter were thus mixed with 500 g of blackcurrants, with 400 cm$^3$ of water and 0,25 g of sodium benzoate.

For tasting, the syrup obtained was mixed with water (about 1:4 by volume) in order to obtain a blackcurrant beverage with a pleasant taste.

EXAMPLE 4

A quantity of 12 liters of starch milk with 33% of dry matter was liquefied by the acid route to a DE of 27,0. It was introduced into a tank of 25 liters after having previously cooled it to 55° C., and the pH was adjusted to 5,65.

1730 international units of $\beta$-amylase in the form of malt extract was added. The speed of hydrolysis was followed by titrating the reducing sugars on regular samplings, until a stable DE of 47,5 was obtained.

The glucid spectrum obtained in indicated in Table VI.

TABLE VI

| Glucid distribution of the hydrolysate obtained | |
|---|---|
| Product of DP | Content of syrup in % |
| DP 1 | 10,1 |
| DP 2 | 46,0 |
| DP 3 | 16,1 |
| DP 4 | 1,2 |
| DP 5 | 1,9 |
| DP 6 | 2,9 |
| DP 7 | 3,8 |
| DP 8 | 4,0 |
| DP 9 | 3,3 |
| DP 10 | 2,0 |
| Between DP 10 and DP 20 | 6,5 |
| DP higher than 20 | 2,2 |

After hydrogenation the hydrolysate was tested as regards non-cariogenicity, by the previously indicated tests. The difference of pH observed at the end of 21 hours, between the control and the hydrolysate tested, was 0,75 of pH unit.

The hydrolysate thus obtained was used for the preparation of a pastry-biscuit icing.

406 grams of this hydrolysate with 75% of dry matter were thus added to 585 g of sorbitol powder in a copper pan with a capacity of about 2 liters. A minimum amount of water was added to complete the solution of the sorbitol.

The mixture was then heated to a temperature of 117° C., checked with a mercury thermometer. The contents of the sauce pan was then poured onto cold marble and allowed to cool to about 80° C.

At this stage, powdered sorbitol of fine granulometry, used as a crystallization initiator, was dispersed in the cooled mass which was kneaded by means of a wooden spatula in order to develop a fine crystallization. When the product had become well crystallized and quite white, it was placed in a pot and allowed to stand for 24 hours.

At the moment of its use for the icing of biscuits, the necessary amount of fondant was softened on a water bath, at a temperature not exceeding 40° C., and was spread over the biscuits by means of a spatula.

The icing thus obtained was white, hard and very bright. Its sweet taste was slightly less than that of a conventional icing with saccharose and glucose syrup, which was recognised by a majority of tasters. The icing thus produced caused, also, a very pleasant momentary sensation of freshness.

EXAMPLE 5

A quantity of 12 liters of starch milk with 33% of dry matter was liquefied by the acid route to a DE of 31,2. It was introduced into a 25 liter tank, the pH was adjusted to 5,6 and the temperature was lowered to 55° C. 1730 international units of β-amylase in the form of malt extract were then reacted with it. The speed of hydrolysis was followed by the determination of the reducing sugars carried out on regular samplings until a stable DE of 51.0 was obtained.

The glucid spectrum obtained is indicated in Table VII.

TABLE VII

| Glucid distribution of the hydrolysate obtained. | |
|---|---|
| Product of DP | Content of syrup in % |
| DP 1 | 15,2 |
| DP 2 | 40,8 |
| DP 3 | 19,9 |
| DP 4 | 2,1 |
| DP 5 | 2,5 |
| DP 6 | 2,6 |
| DP 7 | 3,0 |
| DP 8 | 3,4 |
| DP 9 | 2,8 |
| DP 10 | 2,2 |
| Between DP 10 and DP 20 | 4,4 |
| DP higher than 20 | 1,1 |

After hydrogenation, the hydrolysate was tested as regards non-cariogenicity. The difference of pH observed after 21 hours, between the control and the hydrolysate tested, was 0.50 pH unit.

This non-cariogenic hydrolysate was used for the manufacture of toffees.

In a copper pan of 1 liter capacity, were added successively the following ingredients; 150 g of hydrogenated hydrolysate with 75% of dry matter, 17,4 g of unsweetened concentrated milk with 28% dry matter, 14 g of vegetable fat (Coprah 35) with a melting point of 30° to 35° C., 0,9 g of bicarbonate of soda, in order to improve the development of the colors and, finally, 0,5 g of glycerol monostearate enabling the sticky nature of the toffee to be limited.

The mixture was then heated, with stirring, to a temperature of 130° C. (controlled by means of a mercury thermometer), was poured into a gressed mold, then was left to stand as such until it was quite cool. The caramels were then cut out and wrapped in sealing paper. They were well colored, had a pleasant taste and did not stick to the teeth.

EXAMPLE 6

The non-cariogenic hydrogenated hydrolysate described in Example 1 was used for the manufacture of marshmallows, according to the following operational procedure.

19 g of high bloom gelatin (220 bloom) were first of all dispersed in 56 cm$^3$ of water, then the mixture was heated on a water bath to 50° to 60° C., in order to enable complete solubilization of the gelatin.

Simultaneously, 704 g of hydrogenated hydrolysate with 75% of dry matter were brought, in a pan, to a temperature of 140° C. and then, the pan being withdrawn from the source of heat, 176 g of hydrolysate with 75% of dry matter were rapidly added to the pan, in order to enable faster cooling.

In the bowl of a planetary mixer of the KENWOOD type, 7 g of BIANBEL 193, a product based on milk proteins marketed by the Bel Industries Company, were mixed with 38 cm$^3$ of cold water, slow stirring enabling complete dispersion of the powder. After complete solubilization, the gelatin solution previously dispersed in hot water was poured, with slow stirring, into the bowl of the KENWOOD mixer, followed by the hydrolysate solution. The mixture was then beaten rapidly for 10 minutes and then the dough obtained was molded into a loaf and left to stand for 24 hours.

The loaf was then out up and the pieces were coated by means of powdered sorbitol.

The marshmallows thus obtained were soft, fondant and only slightly sticky.

EXAMPLE 7

The non-cariogenic hydrogenated hydrolysate of example 1 was used, in association with a powdered sorbitol, to carry out the "soft" coating of "hard candies" of example 1, manufactured from hydrogenated hydrolysate. By the term "coating" is generally meant the operation which consists of coating a pre-formed element or core with an adherent envelope, and "soft" coating is distinguished from so-called "hard" coating essentially by the fact that the moisture contained in the coating syrup, instead of being evaporated, is bound by the addition of a powdered solid substance.

The operational method was as follows. A mass of about 1 kg of "hard candies" produced in example 1 was introduced into a coating mill of 30 cm diameter, inclined at 45° (FROGERAIS machine of the "Lilliput" type) and this mill was rotated at the speed of about 30 to 35 rpm.

On to the moving cores, was then poured slowly 20 g of non-cariogenic hydrogenated hydrolysate of Example 1, kept at a temperature comprised between 80° and 100° C. and previously evaporated to 85 Brix. After 1 to 2 minutes, the time necessary for good distribution of the hydrolysate on the surface of the cores, there was added, in the form of a fine spray, 40 g of powdered sorbitol of fine granulometry (NEOSORB ® powder 100). When the layer deposited was quite dry, the slight excess of powder was removed by a draught.

Seven successive similar operations were thus carried out, and then the coated candies obtained were extracted from the mill and were left to stand for 12 hours.

The coated candies obtained had a smooth homogeneous and bright surface. The coated layer was soft under the teeth and the candies, left in the open air, were stable and non-sticky.

We claim:

1. Non-cariogenic hydrogenated starch hydrolysate comprising:
   less than 3% by weight of polyols of DP higher than 20,
   35 to 60% by weight of maltitol,
   0.1 to 19% by weight of sorbitol
   the balance up to 100 consisting essentially of polyols of DP 3 to 20.

2. Non-cariogenic hydrogenated starch hydrolysate comprising:
   less than 3% by weight of polyols of DP higher than 20,
   35 to 60% by weight of maltitol,
   0.1 to 17% by weight of sorbitol,
   the balance up to 100 consisting essentially of polyols of DP 3 to 20.

3. Non-cariogenic hydrogenated starch hydrolysate comprising:
   less than 3% by weight of polyols of DP higher than 20,
   40 to 55% by weight of maltitol,
   0.3 to 14% by weight of sorbitol,
   the balance up to 100 consisting essentially of polyols of DP 3 to 20.

4. Non-cariogenic hydrogenated starch hydrolysate comprising:
   a content lower than 1.5% of products whose DP is higher than 20,
   a content of 0.1 to 19% of sorbitol,
   a content of 35 to 60% of maltitol,
   the balance up to 100 consisting essentially of polyols of DP 3 to 20.

5. Non-cariogenic hydrogenated starch hydrolysate comprising:
   a content lower than 1.5% of products whose DP is higher than 20,
   a content of 0.1 to 17% of sorbitol,
   a content of 35 to 60% of maltitol,
   the balance up to 100 consisting essentially of polyols DP 3 to 20.

6. Non-cariogenic hydrogenated starch hydrolysate according to one of claims 1 to 5, in which the content of polyols of DP less than 3 is less than 65%.

7. Non-cariogenic hydrogenated starch hydrolysate according to one of claims 1 to 5, in which the content of polyols of DP less than 3 is comprised between 45 and 65%.

8. Non-cariogenic hydrogenated starch hydrolysate according to one of claims 1 to 5, in which the content of polyols of DP less than 3 is comprised between 50 and 62%.

9. Process for the preparation of a non-cariogenic hydrogenated starch hydrolysate according to anyone of claim 1 to 5, comprising the successive steps of:
   subjecting a starch to acid or enzymatic hydrolysis giving a prehydrolysate whose DE is of 10 to 35,
   subjecting the prehydrolysate thus obtained to enzymatic treatment giving a hydrolysate wherein said treatment comprises at least the action of one $\beta$-amylase, the conditions of action of this enzyme being selected so that the DE of the hydrolysate is brought to a value up to 45 to 53, and
   hydrogenating the hydrolysate of DE 45 to 53.

10. Process for the preparation of a non-cariogenic hydrogenated starch hydrolysate according to anyone of claims 1 to 5, comprising the successive steps of:
    preparing a prehydrolysate of DE from 27 to 35 by acid hydrolysis,
    bringing the DE to the value of 45 to 53 by the action of a $\beta$-amylase, and
    hydrogenating the hydrolysate of DE 45 to 53.

11. Process for the preparation of a non-cariogenic hydrogenated starch hydrolysate according to anyone of claims 1 to 5, comprising the successive steps of:
    subjecting a starch to acid or enzymatic hydrolysis giving a prehydrolysate whose DE is of 10 to 27,
    subjecting the prehydrolysate thus obtained successively to:
       the action of a $\beta$-amylase,
       the action of a $\alpha$-amylase,
    giving a hydrolysate, the conditions of action of these enzymes being selected so that the DE of the hydrolysate is brought to a value of 46 to 48 by the $\beta$-amylase and to a value of 48 to 51 by the $\alpha$-amylase, and
    hydrogenating the hydrolysate of DE 48 to 51.

12. Process for the preparation of a non-cariogenic hydrogenated starch hydrolysate according to anyone of claims 4 and 5, comprising the successive steps of:
    subjecting a starch to acid or enzymatic hydrolysis giving a prehydrolysate whose DE is of 17 to 27,
    subjecting the prehydrolysate thus obtained successively to:
       the action of a $\beta$-amylase,
       the action of a $\alpha$-amylase,
    giving a hydrolysate, the conditions of action of these enzymes being selected so that the DE of the hydrolysate is brought to a value of 46 to 48 by the $\beta$-amylase and to a value of 48 to 51 by the $\alpha$-amylase, and hydrogenating the hydrolysate of DE 48 to 51.

13. Process for the preparation of a non-cariogenic hydrogenated starch hydrolysate according to anyone of claims 1 to 5, comprising the successive steps of:
subjecting a starch to acid or enzymatic hydrolysis giving a prehydrolysate whose DE is of 10 to 27,
subjecting the prehydrolysate thus obtained successively to:
the action of a β-amylase,
the action of a α-amylase,
giving a hydrolysate, the conditions of action of these enzymes being selected so that the DE of the hydrolysate is brought to a value of 46 to 48 by the β-amylase and to a value of 48 to 51 by the α-amylase, and
hydrogenating the hydrolysate of DE 48 to 51, wherein between the action of the α-amylase and the hydrogenation, the hydrolysate of DE 48 to 51 is subjected to the conjugate action of β-amylase and of an enzyme hydrolysing to 1-6 linkages of the amylopectin to further reduce polysaccharides of DP greater than 20.

14. Process for the preparation of a non-cariogenic hydrogenated starch hydrolysate according to anyone of claims 1 to 5, comprising the successive steps of:
subjecting a starch to acid or enzymatic hydrolysis giving a prehydrolysate whose DE is of 17 to 27,
subjecting the prehydrolysate thus obtained successively to:
the action of a β-amylase,
the action of a α-amylase, giving a hydrolysate, the conditions of action of these enzymes being selected so that the DE of the hydrolysate is brought to a value of 46 to 48 by the β-amylase and to a value of 48 to 51 by the α-amylase, and
hydrogenating the hydrolysate of DE 48 to 51.

* * * * *